(12) United States Patent
Teal

(10) Patent No.: US 6,477,651 B1
(45) Date of Patent: Nov. 5, 2002

(54) INTRUSION DETECTION SYSTEM AND METHOD HAVING DYNAMICALLY LOADED SIGNATURES

(75) Inventor: Daniel M. Teal, San Antonio, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/227,987

(22) Filed: Jan. 8, 1999

(51) Int. Cl.[7] ............................................... H04L 9/00
(52) U.S. Cl. ........................................................ 713/200
(58) Field of Search ................................. 713/200, 201

(56) References Cited

U.S. PATENT DOCUMENTS

| | | | | |
|---|---|---|---|---|
| 5,448,724 A | | 9/1995 | Hayashi .................. | 395/182.02 |
| 5,557,742 A | * | 9/1996 | Smaha et al. ............... | 395/186 |
| 5,919,257 A | | 7/1999 | Trostle ........................ | 713/200 |
| 5,931,946 A | | 8/1999 | Terada et al. ............... | 713/201 |
| 5,991,881 A | | 11/1999 | Conklin et al. ............. | 713/201 |
| 6,298,445 B1 | * | 10/2001 | Shostack et al. ............ | 713/201 |
| 6,321,338 B1 | * | 11/2001 | Porras et al. ............... | 713/201 |

OTHER PUBLICATIONS

"Introduction to Algorithms," by Thomas H. Cormen, Charles E. Leiserson, Ronald L. Rivest, Chap. 34, pp. 853–885, Copyright© 1990.

\* cited by examiner

*Primary Examiner*—Gail Hayes
*Assistant Examiner*—Leynna Ha
(74) *Attorney, Agent, or Firm*—Baker Botts L.L.P.

(57) ABSTRACT

An intrusion detection system and method for detecting unauthorized or malicious use of network resources includes an intrusion detection analysis engine that instanciates one or more analysis objects to detect signatures associated with attacks on network vulnerabilities. As new network vulnerabilities are identified, new analysis objects can be dynamically interfaced on a runtime basis with the intrusion detection analysis engine to detect signatures associated with the new network vulnerabilities. A signature application programming interface supports communication between the intrusion detection analysis engine and the analysis objects. When the instance of an analysis object indicates that an associated signature exists in network data, the intrusion detection analysis engine can provide an alarm.

21 Claims, 1 Drawing Sheet

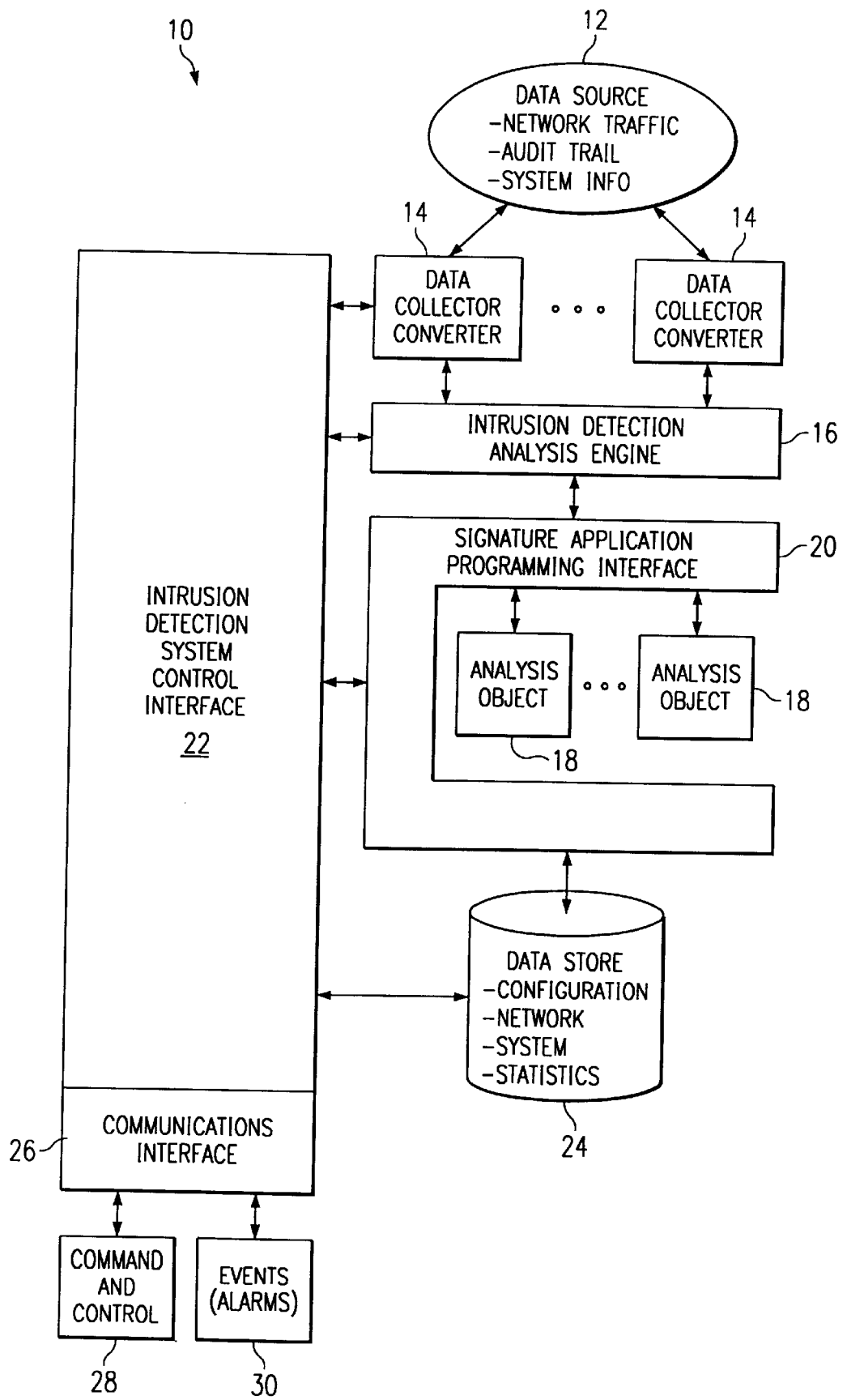

INTRUSION DETECTION SYSTEM AND METHOD HAVING DYNAMICALLY LOADED SIGNATURES

TECHNICAL FIELD OF THE INVENTION

This invention relates in general to the field of computer networks, and more particularly to an intrusion detection system and method having dynamically loaded signatures.

BACKGROUND OF THE INVENTION

Computer networks have become increasingly important means for communicating public and private information between and within distributed locations. The Internet is one example of a public network commonly used for communicating public and private information. Internet web servers provide access to public information, such as news, business information and government information, which the Internet makes readily available around the world. The Internet is also becoming a popular forum for business transactions, including securities transactions and sales of goods and services. A large number of people have come to depend upon reliable Internet access and secure communications on a day by day and even second by second basis. Like the Internet, private networks also have become common means for communicating important information. Private networks, such as company intranets, local area networks (LANs), and wide area networks (WANs) generally limit access on a user by user basis and communicate data over dedicated lines or by controlling access through passwords, encryption or other security measures.

One danger to reliable and secure network communications is posed by hackers or other unauthorized users disrupting or interfering with network resources. The danger posed by unauthorized access to computer network resources can vary from simple embarrassment to substantial financial losses. For instance, hackers recently attacked a prominent newspaper web site, disabling the web site and causing the newspaper substantial embarrassment. More serious financial disruptions occur when hackers obtain financial account information or credit card information and use that information to misappropriate funds.

Typically, network administrators use various levels of security measures to protect the network against unauthorized use. Hackers, on the other hand, attempt to find and attack vulnerabilities of the security measures and network devices in order to obtain unauthorized entry to the computer network. Although sophisticated security measures can provide significant barriers to hackers, virtually any security measure can be breached through a vulnerability with enough effort.

Intrusion detection systems are commonly used in networks to detect and identify unauthorized use of the computer network before the network resources and information are substantially disrupted or violated. In general, intrusion detection systems look for specific patterns in network traffic, audit trails, and other data sources to detect malicious activity. Conventional intrusion detection systems often identify patterns, also known as signatures, by analyzing network data with various implementations for identifying the patterns, such as finite state machines, simple pattern matching, or specialized algorithms. Typically, implementations for identifying malicious activity patterns are hard coded as part of the binary code that executes to monitor network data for predetermined patterns and reports detected patterns to network administration.

Conventional intrusion detection systems have a number of difficulties. One significant difficulty is that when a new vulnerability, or type of attack on the network, is discovered, a new signature generally must be incorporated into the software, compiled and redistributed to the intrusion detection systems. Thus, upgrading an intrusion detection system to address a new vulnerability generally requires an entire new compiled binary code. Replacing or modifying the binary code is expensive and time consuming. Further, as binary code becomes longer and more complex, performance of the intrusion detection system may suffer.

Another difficulty with conventional intrusion detection systems is that, when new code is introduced, the intrusion detection system generally must be shut down. However, networks, especially in the corporate environment, usually remain available on a continuous basis. Thus, if an attacker launches an attack against a defended network when the intrusion detection system is turned off for a maintenance upgrade, significant damage can occur.

Another difficulty with conventional intrusion detection systems is the difficulty in modifying the systems to support individualized network needs. For instance, many networks use home-grown application level protocols for specific client server applications, such as user authentication. In order for conventional intrusion detection systems to support such individualized network systems, system-specific binary code must be written and implemented. This process is expensive and time consuming, and typically requires testing of a complete system even when only minor changes are made for adapting the system to a user specific network application. Further, in order to modify an intrusion detection system's binary code, programmers need access to the entire source code, which can result in unnecessary disclosure of proprietary elements of an intrusion detection system to outside programmers.

SUMMARY OF THE INVENTION

Therefore, a need has arisen for a method and system which simplifies the modification of intrusion detection systems to adapt to new network vulnerabilities.

A further need exists for a method and system which supports upgrades to an intrusion detection system in a dynamic manner without shutting down the intrusion detection system.

A further need exists for a method and system which supports upgrades to intrusion detection systems to protect network-specific applications.

In accordance with the present invention, an intrusion detection system and method having dynamically loaded signatures are provided that substantially eliminate or reduce disadvantages and problems associated with previously developed intrusion detection system and methods. An intrusion detection analysis engine instanciates an analysis object using network data. An attack on the network is detected with the instance of the analysis object.

More specifically, network vulnerabilities are identified that could allow an attack on a network. Signatures associated with each network vulnerability are determined by investigating specific patterns of network data associated with an attack on the vulnerability. An analysis object is created for analyzing network data to detect the signature associated with the network vulnerability.

An intrusion detection analysis engine accepts network data from a data collector converter. The intrusion detection analysis engine interfaces with the analysis object through an application programming interface to instanciate the analysis object with the network data. The instance of the analysis object enables the intrusion detection analysis engine to determine whether a signature associated with the network vulnerability exists. If the instance of the analysis object determines that the signature exists, then the intrusion detection system alerts the network of a potential attack.

In one embodiment, the analysis object is dynamically provided to interface with the intrusion detection analysis engine by using the application programming interface. For instance, the analysis object is precompiled into machine language and interfaced with the intrusion detection analysis engine during operation of the intrusion detection analysis engine. In this manner, when a new vulnerability of a network is determined, a new analysis object is created to support detection of a signature associated with the new vulnerability. The new analysis object is interfaced with the intrusion detection analysis engine using the application programming interface on a runtime basis, allowing the intrusion detection analysis engine to detect attacks on the new vulnerability without shutting down the intrusion detection analysis engine.

The present invention provides a number of important technical advantages. One important technical advantage is that the intrusion detection system remains running while new signatures are loaded. This allows continuous monitoring of the network and enhanced reliability for preventing attacks on the network.

Another important technical advantage of the present invention is that each network vulnerability may have an analysis object specifically directed towards detecting attacks for that particular vulnerability. Thus, analysis objects can be loaded as plug-ins as needed for particular networks. Thus, for instance, an intrusion detection system can have specific analysis objects for protecting homegrown application level protocols for specific client server applications such as user authentication. Also, advantageously, performance impacts are minimized as new analysis objects are added. Further, by dynamically loading and unloading specific analysis objects, the present invention reduces the need for modifying entire intrusion detection system binary code as new vulnerabilities are determined.

BRIEF DESCRIPTION OF THE DRAWINGS

A more complete understanding of the present invention and advantages thereof may be acquired by referring to the following description taken in conjunction with the accompanying drawings, in which like refence numbers indicate like features, and wherein:

The FIGURE depicts a block diagram of one embodiment of an intrusion detection system having dynamically loaded signatures implemented with analysis objects.

DETAILED DESCRIPTION OF THE INVENTION

Detection of attacks on a network often amounts to a cat and mouse game of electronic warfare in a rapidly changing environment. Hackers are quite creative in their search for vulnerabilities that will allow them to obtain unauthorized access to a computer network, often for malicious purposes. One key goal of hackers is to obtain access to networks without detection. Although a creative hacker is difficult to detect in an established network environment, the difficulty of detecting a hacker is compounded by the rapid growth in the number and types of networks coming online. Network administrators must be flexible to respond to attacks by hackers in an effective manner. The present invention supports rapid response to network vulnerabilities through an object-oriented implementation of dynamically loaded signatures.

The FIGURE depicts a block diagram of one embodiment of an intrusion detection system having dynamically loaded signatures implemented with an analysis object. The intrusion detection system 10 of the FIGURE allows monitoring of network data to detect attacks on a network. If an attack is detected on the network, intrusion detection system 10 provides notice of the attack to a network administrator, allowing the administrator to respond to the attack. Intrusion detection system 10 supports 7-day a week, 24-hour a day, 365-day a year level of operations to maintain a highly reliable network environment.

As shown, intrusion detection system 10 accepts network data from a data source 12. One or more data collector converters 14 collect the network data and convert the network data into predetermined formats for analysis. Data source 12 can include network routers and servers that provide network traffic data, audit trail data, system information data, and other data sources. In one embodiment, a data collector converter 14 is used for each type of network data collected from the network. For instance, a separate data collector converter 14 can be used for collecting and converting network traffic data, audit trail data, and system information data.

An intrusion detection analysis engine 16 interfaces with the one or more data collector converters 14 to accept the network data and analyze the network data for malicious or unauthorized use of network resources. Intrusion detection analysis engine 16 analyzes network data to look for specific patterns that indicate malicious activity on the network. These patterns, known as signatures, are generally unique to each type of vulnerability of the network. In the illustrated embodiment, intrusion detection analysis engine 16 performs this analysis using one or more analysis objects 18 and interfaces with the one or more analysis objects 18 through a signature application programming interface (API) 20. Each analysis object 18 provides dynamically loadable and unloadable executable code for identification of a signature associated with an attack on a network vulnerability. In addition, signature application programming interface 20 allows the distribution of a signature development kit to third party developers for creating analysis objects 18 that can interface to intrusion detection analysis engine 16.

An intrusion detection system control interface 22 communicates with data collector converters 14, intrusion detection analysis engine 16, signature development kit API 20, and a data store 24 to support user inputs and to provide system outputs to a user. A communications interface 26 accepts command and control instructions from a command and control module 28 and provides events, such as alarms indicating malicious or unauthorized use of the network, to an events module 30. Data store 24 stores configuration, network, system and statistics information relating to intrusion detection system 10.

In operation, intrusion detection analysis engine 16 accepts network data from data collector converter 14 and communicates with one or more analysis objects 18 through signature API 20 to determine whether the network is experiencing an attack. Intrusion detection analysis engine 16 instanciates analysis object 18 with network data provided by data collector converter 14 and with any other parameters needed by analysis objects 18 to perform the respective analysis. The instance of analysis object 18 generated by intrusion detection analysis engine 16 allows intrusion detection analysis engine 16 to determine whether a signature associated with analysis object 18 exists in the network data. If the instance of analysis object 18 indicates the existence of a signature or other analyzed event, intrusion detection analysis engine 16 communicates an alarm through intrusion detection system control interface 22 and communications interface 26 to events module 30.

If a new vulnerability of the network is found, a new analysis object 18 can be developed to detect a signature associated with the new vulnerability. A user at command and control module 28 can then implement the new analysis object by communicating with signature API 20 through intrusion detection system control interface 22. The signature of the new vulnerability can be implemented as an analysis object with shared libraries under UNIX or with DLLs under WINDOWS NT, 95, 98, etc. The new analysis object 18 can be precompiled into binary code and interfaced with intrusion detection analysis engine 16 dynamically, on a runtime basis, so that intrusion detection system 10 remains online to detect attacks on the network during the development and interfacing of the new analysis object 18.

In addition to allowing dynamic runtime creation and interfacing of a new analysis object 18, signature API 20 also supports user-specific implementations of analysis objects 18. For instance, home-grown application level protocols for specific client server applications, such as user authentication protocols, can be protected on a network by network basis. Due to the ability to dynamically load analysis object 18, the addition of analysis objects to an intrusion detection system 10 generally does not require modification to intrusion detection analysis engine 16. Thus, a network administrator can design and implement an intrusion detection system 10 that addresses specific network needs on a vulnerability by vulnerability basis.

When intrusion detection analysis engine 16 is first initialized, it scans the directory of data store 24 to locate analysis objects of intrusion detection system 10. The analysis objects are then interfaced with intrusion detection analysis engine 16 by signature development kit API 20. In one implementation, intrusion detection analysis engine 16 and the analysis objects 18 compare versions and settle upon a common application programming interface version. A cryptographic exchange is then conducted to ensure that analysis objects 18 are legitimate and licensed. Each analysis object 18 then updates data store 24 for configuration items, including default values. Intrusion detection analysis engine 16 then queries each analysis object 18 to determine the type of data required for analysis. Intrusion detection analysis engine 16 also queries analysis object 18 to determine timer values for asynchronous processing if needed. When analysis objects 18 have been interfaced with intrusion detection analysis engine 16, intrusion detection analysis engine 16 processes the configuration file of data store 24. The configuration information found within configuration file of data store 24 may override default configurations of each analysis object 18. Further, configuration may occur during operation of intrusion detection system 10 through command and control module 28.

Although the present invention has been described in detail, it should be understood that various changes, substitutions and alterations can be made hereto without departing from the spirit and scope of the invention as defined by the appended claims.

What is claimed is:

1. An intrusion detection system for detecting unauthorized use of a network, the system comprising:

an analysis object for identifying a signature in network data, the signature associated with an attack on a network vulnerability;

an intrusion detection analysis engine interfaced with the network to accept network data, and interfaced with the analysis object, the intrusion detection analysis engine operable to instanciate the analysis object with network data and to use the instance of the analysis object to detect an attack on the network; and an application programming interface operable to dynamically interface a new analysis object with the intrusion detection analysis engine on a runtime basis, wherein the new analysis object comprises an identification of a signature in network data associated with an attack on a new network vulnerability.

2. The system of claim 1 further comprising additional analysis objects, each analysis object for identifying a predetermined signature in network data associated with a predetermined network vulnerability.

3. The system of claim 1 further comprising a data collector converter for collecting network data and providing the network data to the intrusion detection analysis engine.

4. A method for detecting an attack on a network, the method comprising the steps of:

providing network data to an intrusion detection analysis engine;

instanciating an analysis object with the network data;

pre-compiling the analysis object;

dynamically interfacing the analysis object with the intrusion detection analysis engine on a runtime basis; and detecting an attack on the network with the instance of the analysis object.

5. The method of claim 4 further comprising the step dynamically of interfacing additional analysis objects with the intrusion detection analysis engine through an application programming interface.

6. The method of claim 5 wherein each analysis object detects a predetermined signature associated with an attack on a predetermined network vulnerability.

7. The method of claim 6 further comprising the steps of:

determining a new network vulnerability;

creating a new analysis object for detecting a signature associated with the new network vulnerability; and dynamically interfacing the new analysis object with the intrusion detection analysis engine.

8. A method for detecting unauthorized use of a network, the method comprising the steps of:

determining a signature associated with an attack on a network vulnerability;

creating an analysis object, the analysis object for analyzing network data to detect the signature;

dynamically providing the analysis object to an intrusion detection system through an application programming interface; and detecting an attack on the network vulnerability with the intrusion detection system using the analysis object to detect the signature.

9. The method of claim 8 wherein the network data comprises network traffic data.

10. The method of claim 8 wherein the network data comprises audit trail data.

11. The method of claim 8 wherein the data comprises system information data.

12. The method of claim 8 wherein the dynamically providing step further comprises pre-compiling the analysis object into binary code and providing the analysis object to the intrusion detection system while the intrusion detection system is operating.

13. The method of claim 8 further comprising the step of generating an alarm when an attack is detected.

14. A method for detecting an attack on a network comprising the steps of:

collecting network data;

providing the network data to an intrusion detection system;

dynamically interfacing the intrusion detection system with an analysis object using an application programming interface; and detecting an attack on the network with the intrusion detection system and the analysis object.

15. The method of claim 14 wherein the analysis object detects a signature associated with an attack on a predetermined network vulnerability.

16. The method of claim 14 wherein the interfacing step further comprises interfacing the intrusion detection system with plural analysis objects, each analysis object for detecting a predetermined signature associated with a predetermined attack on the network.

17. The method of claim 16 wherein the network data comprises network traffic data.

18. The method of claim 16 wherein the network data comprises audit trail data.

19. The method of claim 16 wherein the network data comprises system information data.

20. The method of claim 14 further comprising the steps of:

determining a network vulnerability;

creating a new analysis object for detecting an attack on the new network vulnerability;

using the application programming interface to dynamically interface the new analysis object with the intrusion detection system; and detecting an attack on the new network vulnerability with the intrusion detection system and the new analysis object.

21. The method of claim 14 wherein using the application programming interface step further comprises the steps of:

precompiling the new analysis object into binary code; and dynamically interfacing the new analysis object with the intrusion detection system at runtime.

* * * * *